(12) United States Patent
Vozzi et al.

(10) Patent No.: US 11,945,161 B2
(45) Date of Patent: Apr. 2, 2024

(54) COMBINED ELECTROSPINNING AND MICROEXTRUSION APPARATUS

(71) Applicant: UNIVERSITA' DI PISA, Pisa (IT)

(72) Inventors: Giovanni Vozzi, Pisa (IT); Aurora De Acutis, Leghorn (IT); Carmelo De Maria, Lamezia Terme (IT); Guglielmo Pacetta, Badolato (IT)

(73) Assignee: UNIVERSITA' DI PISA, Pisa (IT)

( * ) Notice: Subject to any disclaimer, the term of this patent is extended or adjusted under 35 U.S.C. 154(b) by 0 days.

(21) Appl. No.: 17/052,356

(22) PCT Filed: May 3, 2019

(86) PCT No.: PCT/IB2019/053625
§ 371 (c)(1),
(2) Date: Nov. 2, 2020

(87) PCT Pub. No.: WO2019/211803
PCT Pub. Date: Nov. 7, 2019

(65) Prior Publication Data
US 2021/0053284 A1    Feb. 25, 2021

(30) Foreign Application Priority Data

May 4, 2018 (IT) .................... 102018000005065

(51) Int. Cl.
*B29C 64/209*  (2017.01)
*B29C 48/02*   (2019.01)
(Continued)

(52) U.S. Cl.
CPC ......... *B29C 64/209* (2017.08); *D01D 5/0061* (2013.01); *B29C 48/02* (2019.02);
(Continued)

(58) Field of Classification Search
CPC ..... B29C 64/209; B29C 64/245; B29C 64/25; B29C 48/02; B29C 48/266; D01D 5/0061; B33Y 30/00; B29L 2031/753
See application file for complete search history.

(56) References Cited

U.S. PATENT DOCUMENTS 7,625,198 B2 * 12/2009 Lipson ................ B33Y 50/00
                                                     425/375
7,939,003 B2 *  5/2011 Bonassar ............. B22F 12/90
                                                     264/308
(Continued)

FOREIGN PATENT DOCUMENTS

CN    106012052 A  * 10/2016
CN    106012052 A    10/2016
(Continued)

OTHER PUBLICATIONS

Dai et al., EPO Machine Translation of CN-106012052-A (Year: 2016).*
(Continued)

*Primary Examiner* — Seyed Masoud Malekzadeh
(74) *Attorney, Agent, or Firm* — Ferguson Case Orr Paterson (57) ABSTRACT

A combined electrospinning and microextrusion apparatus includes a robotic manipulator having a plurality of degrees of freedom, an end effector supported and movable by the robotic manipulator, a plurality of extruders housed on the end effector, each extruder having an interchangeable nozzle for extrusion of material, a working plane for deposition of extruded material, a pneumatic circuit supplying a fluid flow to the extruders for controlling extrusion of material, and an electric generator selectively activatable to apply a potential difference between the nozzles of the extruders and the working plane. The extruders are capable of operating selectively in microextrusion mode with inactive electric (Continued)

generator or in electrospinning mode with active electric generator, in an independent manner from each other.

9 Claims, 7 Drawing Sheets

(51) Int. Cl.
    *B29C 48/25*     (2019.01)
    *B29C 64/245*     (2017.01)
    *B33Y 30/00*     (2015.01)
    *D01D 5/00*     (2006.01)
    *B29L 31/00*     (2006.01)

(52) U.S. Cl.
    CPC .......... *B29C 48/266* (2019.02); *B29C 64/245* (2017.08); *B29L 2031/753* (2013.01); *B33Y 30/00* (2014.12)

(56) References Cited

U.S. PATENT DOCUMENTS

| | | | | |
|---|---|---|---|---|
| 8,636,938 B2* | 1/2014 | Bonassar | ................ | A61L 27/54 264/308 |
| 8,877,112 B2* | 11/2014 | Bonassar | ............... | B33Y 30/00 264/308 |
| 9,242,031 B2* | 1/2016 | Bonassar | ................ | A61L 27/36 |
| 9,723,866 B2* | 8/2017 | Lipson | ................... | B33Y 40/00 |
| 2009/0208577 A1 | 8/2009 | Xu et al. | | |
| 2017/0128601 A1* | 5/2017 | DeCiccio | ............... | B33Y 10/00 |
| 2017/0355018 A1* | 12/2017 | Karlen | ................... | B33Y 30/00 |
| 2020/0147873 A1* | 5/2020 | Lewis | ................... | B29C 64/118 |

FOREIGN PATENT DOCUMENTS

| | | |
|---|---|---|
| EP | 2340785 A1 | 7/2011 |
| WO | 2015027156 A1 | 2/2015 |
| WO | 2016198291 A1 | 12/2016 |

OTHER PUBLICATIONS

International Search Report, issued in PCT/IB2019/053625, dated Jul. 25, 2019, Rijswijk, Netherlands.
Paul D. Dalton et al, Electrospinning and additive manufacturing: converging technologies, Biomaterials Science, Jan. 1, 2013, pp. 171-185, vol. 1, No. 2, The Royal Society of Chemistry, London, GB.
Written Opinion issued in PCT/IB2019/053625; dated Jul. 25, 2019.

* cited by examiner

COMBINED ELECTROSPINNING AND MICROEXTRUSION APPARATUS

CROSS-REFERENCE TO RELATED APPLICATIONS

This application is a National Phase Application of PCT International Application No. PCT/IB2019/053625, having an International Filing Date of May 3, 2019 which claims the benefit of priority to Italian Patent Application No. 102018000005065, filed May 4, 2018, each of which is hereby incorporated by reference in its entirety.

Field of the Invention

The present invention refers in general to the techniques of nano- and microfabrication in the field of tissue engineering.

Background of the Invention

Tissue engineering is a multidisciplinary science the objective of which is the creation of functional and biocompatible biological substitutes, capable of restoring the function of a damaged organ or tissue and possibly replacing it. The aforementioned biological tissue may be considered as a heterogeneous structure with a topology defined by nano- and microscale elements.

Since biological tissues are composed of micro- and nanoscale elements, a structure (or scaffold) capable of replacing or repairing them needs to be composed of different types of materials, processed on multiple scales, with adequate mechanical and structural properties, capable of mimicking the physiological environment. The introduction of elements at the nanoscale is necessary to increase the surface-volume ratio of a structure, promoting the adhesion of cells and ensuring the proliferation thereof.

In a different way, the microscale elements define the three-dimensional space wherein the elimination of cellular waste products and a good influx of nutrients is guaranteed.

In order to guarantee the aforementioned features within a structure, different types of materials must be processed by means of different techniques that guarantee diversity in the spatial resolution scale within the same structure.

Currently, the use of additive manufacturing technologies is one of the most promising approaches for the manufacture of scaffolds with controlled architecture through the use of a wide range of natural or synthetic materials. With technologies based on the aforesaid approach, starting from a three-dimensional model created using CAD (Computer-Aided Design) software, it is possible to create a structure by means of computer-aided manufacturing (CAM), which allows the construction of the same by means of material deposition layer-by-layer until it is completely formed. This approach is also known in the literature as Bioprinting.

Of great interest are the hybrid structures obtained through the combination of additive manufacturing techniques with electrospinning technology, which allows continuous filaments of material with a diameter of less than a micrometer to be obtained through the use of an electrostatic field, which determines the stretching, elongation and reduction of the cross-section of the material being processed. The presence of the aforesaid electrostatic field during the use of the electrospinning technique causes the main difficulty in creating a device that may combine such a technique with extrusion technology. This factor makes it necessary to use shielding on any component that may cause a disturbance in the electric field or compromise the functionality thereof. Moreover, the use of non-conductive materials and appropriate design distances of the various elements of the device becomes necessary to avoid any interaction with the electrostatic field generated.

There are several known devices that use the techniques of electrospinning and extrusion with separate processing stations, which limit the quality of the structure to be made, the construction process of which is continuously interrupted because the aforesaid devices must automatically move the working plane between the various stations present in order to combine the aforementioned manufacturing techniques. The presence of separate processing stations within the aforesaid devices increases the overall bulk of the machine, as well as the working time, risking disturbing the structure during construction.

There is therefore a need for manufacturing devices capable of combining different techniques in the same workspace, avoiding the use of separate devices, and the obligation of having to move the piece under construction from the workspace of one device to that of another device.

SUMMARY OF THE INVENTION

Therefore, the object of the invention is a combined electrospinning and microextrusion apparatus, comprising
- a robotic manipulator provided with a plurality of degrees of freedom,
- an end effector supported and movable by the robotic manipulator,
- a plurality of extruders housed on the end effector, each of said extruders being provided with an interchangeable nozzle for the extrusion of at least one material,
- a working plane configured for the deposition of the extruded material,
- a pneumatic circuit configured to supply a fluid flow to the extruders for controlling the extrusion of the material, and
- an electric generator selectively activatable to apply a potential difference between the nozzles of the extruders and the working plane, whereby the extruders are capable of operating selectively in microextrusion mode with inactive electric generator or in electrospinning mode with active electric generator, in an independent manner from each other.

The aforesaid invention solves the problem of the presence of separate stations in the same device since the aforementioned multiple extruders are housed on the only end effector of the robotic manipulator. The extruders comprise interchangeable nozzles that allow, through a simple and fast replacement thereof, a scale variation of the spatial resolution of the structure to be constructed, even during the processing of the same. In microextrusion mode, it is possible to obtain structures with characteristic dimensions up to the order of the micrometer (10-100 microns), while in electrospinning mode it is possible to obtain nanofibrous structures with fiber diameter of about 50-100 nanometers.

The possibility of processing by means of the microextrusion and electrospinning technique using a single station allows the manufacturing speed to be increased and these techniques to be combined in a simple and fast way without having to move the structure during the construction stage.

Moreover, the high mobility of the manipulator in the space provides the possibility for making different structures at the same time on the same working plane.

BRIEF DESCRIPTION OF THE DRAWINGS

Further features and advantages of the invention will become more apparent in the following detailed description of an embodiment of the invention, made with reference to the accompanying drawings, provided to be purely illustrative and non-limiting, wherein.

DETAILED DESCRIPTION

Figure 1:
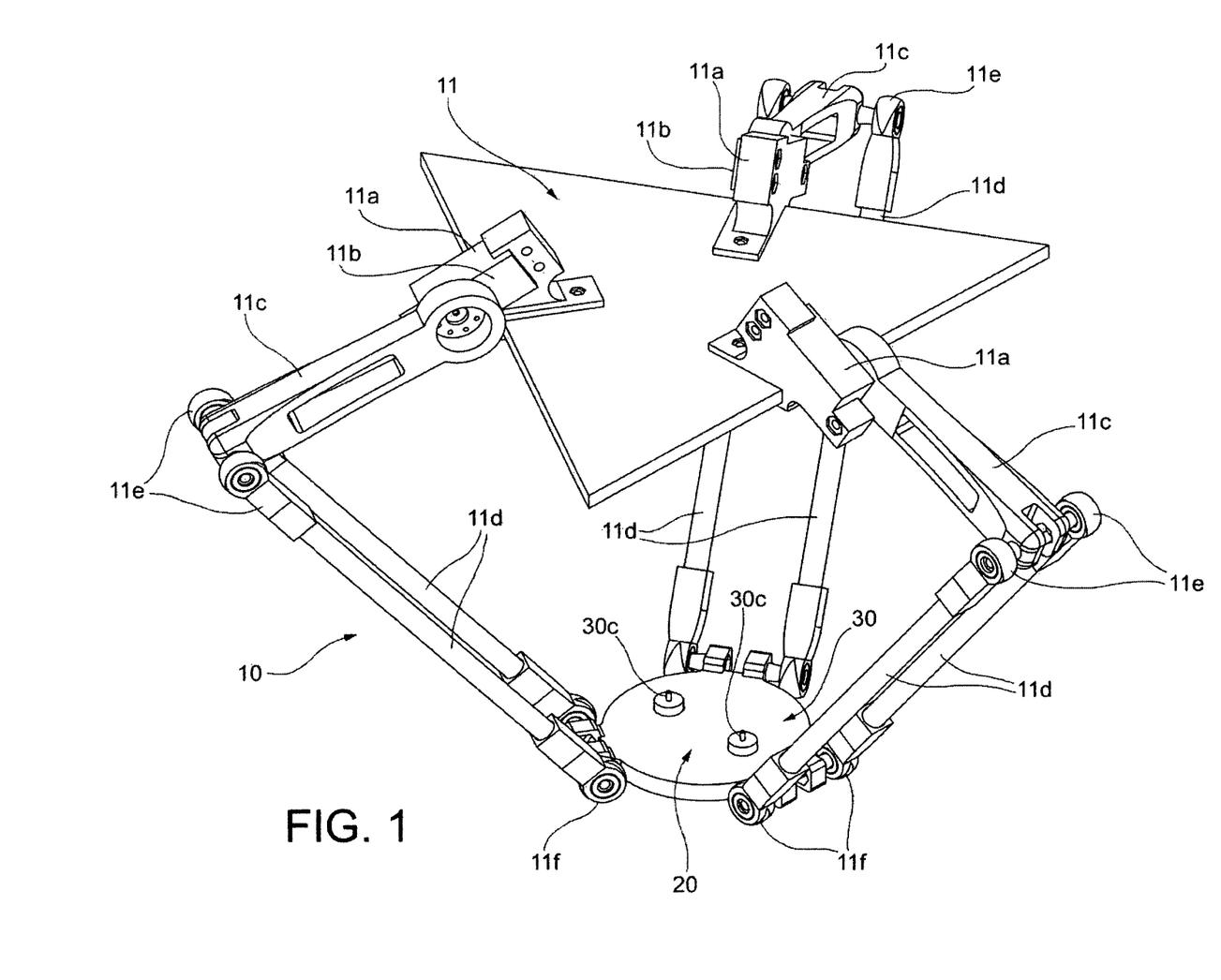
FIG. 1 is a perspective view of a robotic manipulator of an apparatus according to the invention.
Figure 2:
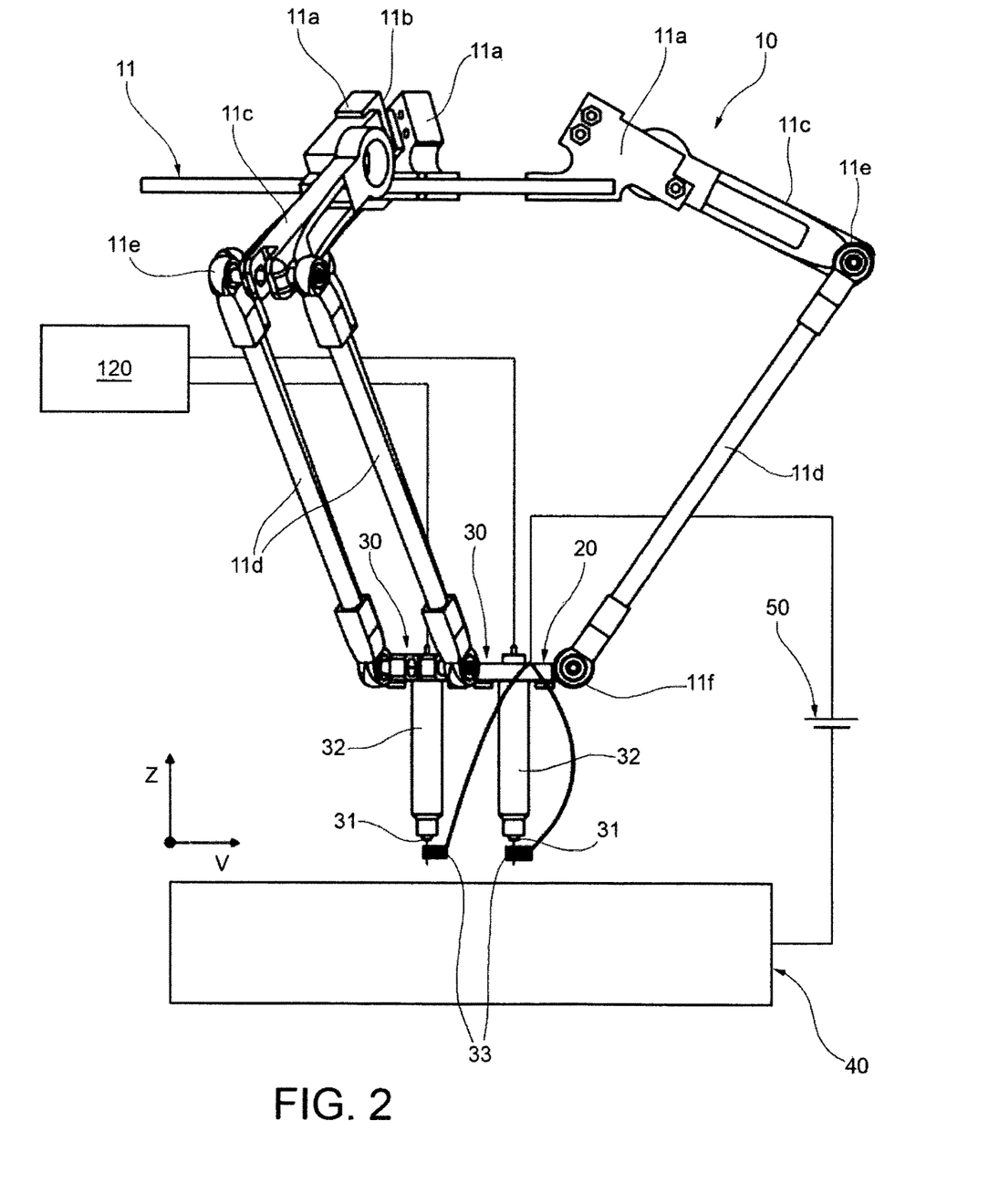
FIG. 2 is a side elevation view of the manipulator of FIG. 1.

With reference initially to FIGS. 1 and 2, a microextrusion and electrospinning apparatus comprises a robotic manipulator 10, which in the embodiment illustrated is based on a robotic system with a parallel-type architecture, able to ensure precision and speed in the movements of its end effector 20, indicated hereinafter in the text also as a movable platform. The end effector 20 may accommodate a number of pneumatic extruders 30 for the deposition of material, visible for example in FIG. 2.

The embodiment with parallel-type robotic architecture comprises several kinematic linkages that connect a fixed upper platform 11 to the movable platform 20 that constitutes the end effector of the apparatus. This upper platform 11 is attached and anchored to the upper wall 13a (see FIG. 3) of a structure 13 in which the manipulator 10 is housed. The attachment of the aforementioned upper platform 11 is made possible by means of a support 12 made of non-conductive material. On the sides of the same upper platform 11 are arranged the housings 11a for actuators 11b, one per kinematic linkage, which allow the actuation of the movements of the articulated system.

Each kinematic linkage comprises two structural elements made of non-conductive material: the upper arm 11c and the articulated parallelogram 11d. The upper arm 11c allows the connection of the kinematic linkage to the respective actuator 11b. The arm 11c is connected to the subsequent articulated parallelogram 11d by means of two ball joints 11e. The articulated parallelograms 11d are also made of non-conductive material. Each articulated parallelogram 11d is connected to the end effector 20 by ball joints 11f. The ball joints 11e and 11f are made of non-conductive material. These joints make the structure simpler by facilitating the fluidity of the movements according to the multiple degrees of freedom of the machine. More generally, all the components are attached with connections made of non-conductive material, in order to avoid metal components close to the working plane of the device, which could create variations in the electrical field produced during the electrospinning stage.

A working plane, or deposition platform 40, shown for example in FIG. 2, is composed of conductive material. The working plane 40 is configured to be easily interchangeable; for example, this plane may provide for a support on which a sheet of conductive material guided by rollers is positioned. The aforesaid working plane 40 allows the controlled deposition during the microextrusion stage and nanofiber deposition during the electrospinning stage, during which a potential difference between the nozzles 31 associated with the extruders 30 and the aforesaid working plane 40 is applied to create an electrostatic field capable of electrospinning the material contained in the reservoirs 32 of the extruders 30. In order to apply this potential difference, it is envisaged that nozzles 31 provided with a needle made of conductive material are fitted with respective terminals 33 connected to a voltage generator 50. The voltage generator 50 provides the constant potential required for the use of the electrospinning technology.

Figure 3:
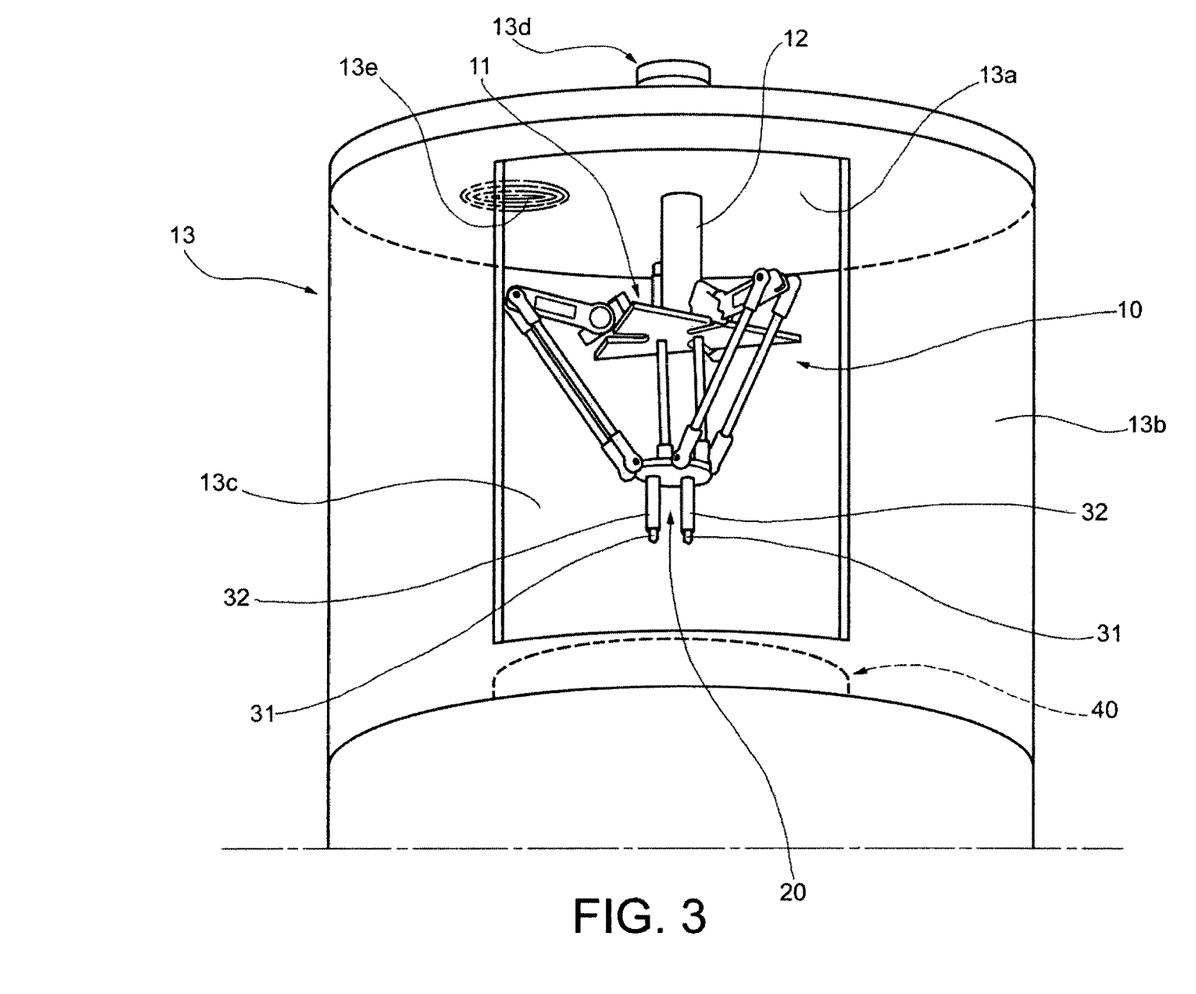
FIG. 3 is a perspective view of the manipulator within an insulation structure.

The structure 13 where the manipulator 10 and the working plane 40 are housed may assume a cylindrical shape and has side walls 13b made of non-conductive material that prevent the dispersion of electric field to the outside during the electrospinning stage. The structure 13 is provided with an access system 13c, such as a door or porthole, which is also made of non-conductive material. Such structure 13 has a visualization system from the outside that allows one to observe the stage of work of the device contained therein. This visualization system may simply consist of the side walls 13b of the structure 13 being made of optically transparent material.

The housing structure 13 may provide for a safety system to ensure safe handling, a stop in the event of either automatic or manual malfunctions and an audible and visual alarm system (indicated at 13d in FIG. 3). The possible presence of an air recirculation system (indicated at 13e in FIG. 3) avoids the leakage from the structure of any residues caused by the evaporation of solvents during the electrospinning process, and the installation of possible shielded lights would ensure excellent visibility even in the case of poor external lighting.

In addition, an electrical discharge control system allows safe operation during the electrospinning stage. The aforesaid system stops the stage of work in progress if anomalous electrical currents caused by such discharges are detected inside the workspace.

Figure 6:
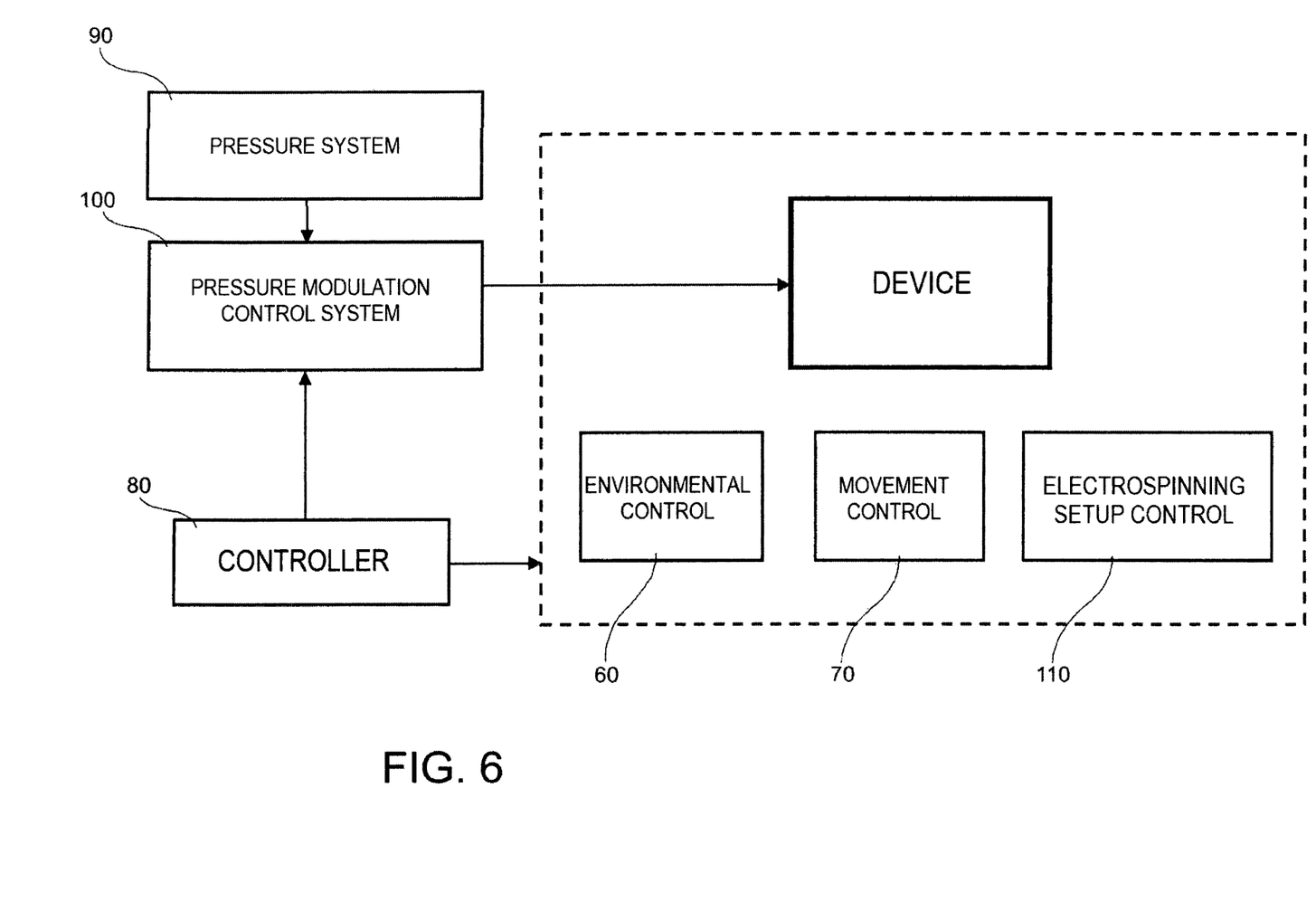
FIG. 6 is a block diagram of an apparatus according to the invention.

The possible presence of an environmental control system (indicated at 60 in FIG. 6) allows the monitoring of temperature and humidity parameters. Such control allows one to set desired conditions within the working environment of the device based on the materials chosen and techniques used to achieve optimum success in the structure to be constructed.

The control of the movements of the device (reference 70 in FIG. 6) is made possible by firmware implemented on a microcontroller 80 that allows one to take advantage of the features of the device by controlling the actuators present. An external control system may be composed of a joystick and a push button panel for the movements and rotations of the movable platform of the robotic manipulator. An interface present in the controller 80 further allows the optimal pressure to be set for the use of the pneumatic extrusion system (reference 90 in FIG. 6) by means of the automatic regulation of a solenoid valve system (reference 100). Moreover, such a system allows the parameters that are useful for the correct operation of the electrospinning mode (reference 110) to be set.

Figure 4:
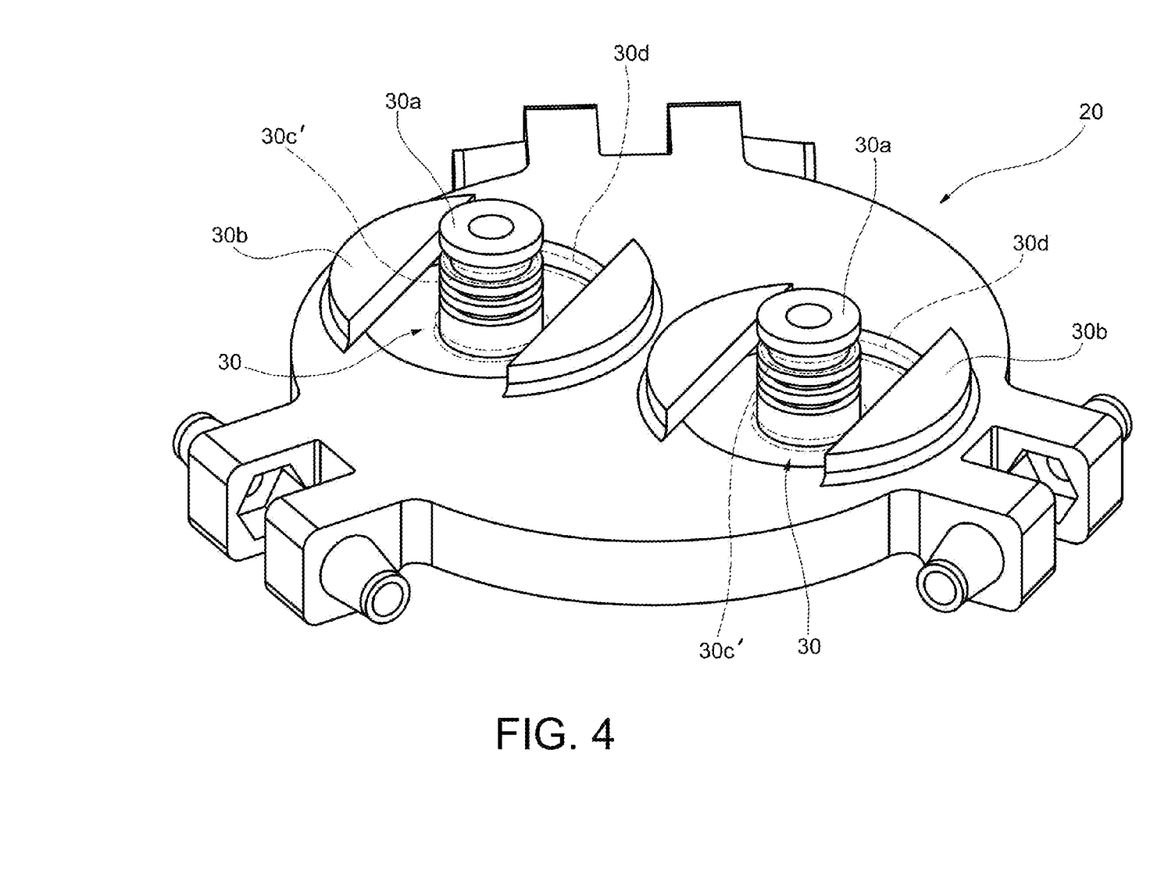
FIGS. 4 and 5 are perspective views, respectively from the bottom and top of an end effector of the manipulator of FIG. 1.
Figure 5:
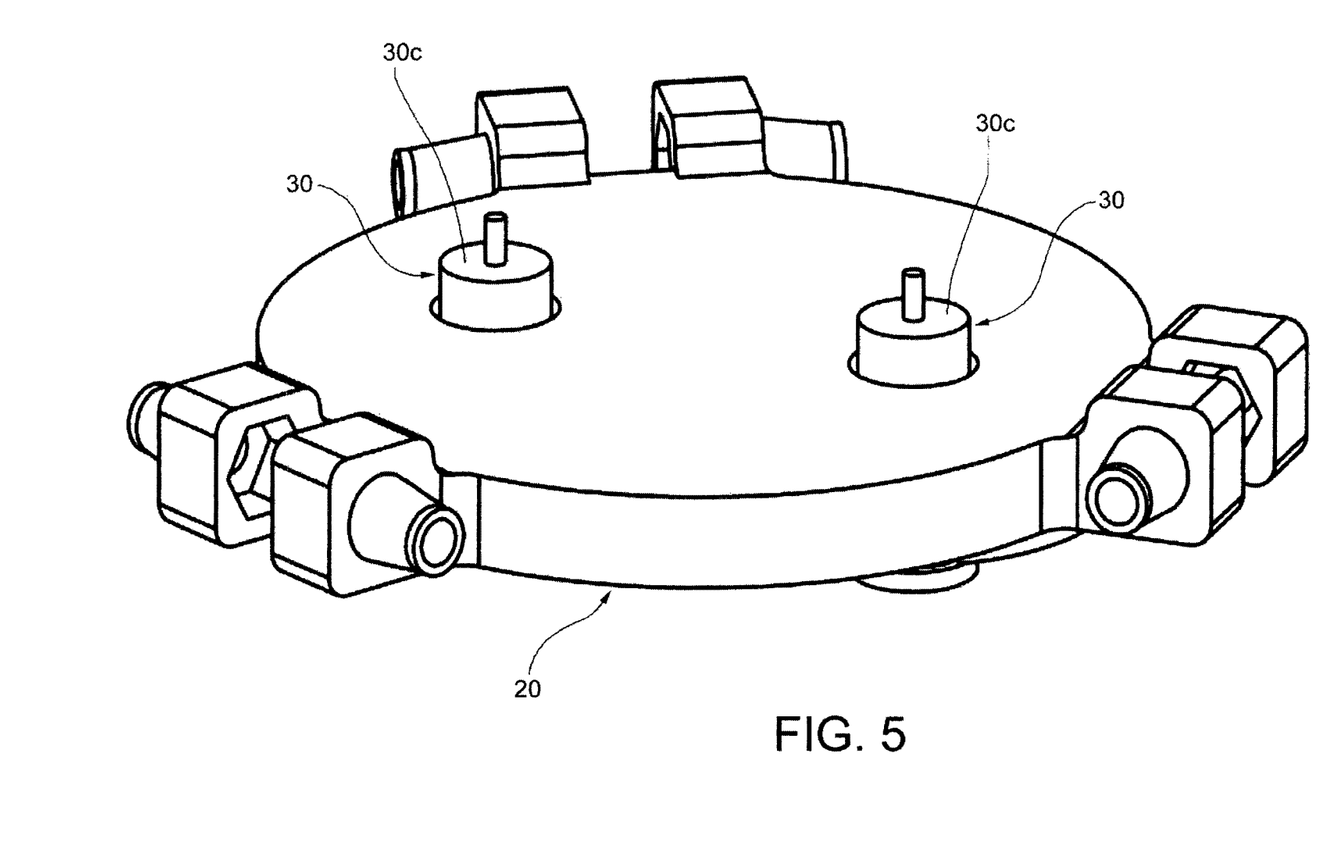

The aforementioned movable platform 20, or end effector, is shown in FIGS. 4 and 5 and houses several pneumatic extruders 30 that allow the deposition of the material through the use of reservoirs 32 provided with nozzles 31. The structure of each extruder 30 comprises a seat for the installation of the respective reservoir 32. In the example shown, this seat comprises a central hollow pin 30a and two opposing side protrusions 30b, which allow the interlocking and locking by rotation of the reservoir 32 and ensure easy removal of the reservoir for fast replenishment of material.

On the upper part of the aforesaid movable platform 20 (shown in FIG. 5) there are connectors 30c in fluid communication with the respective hollow pins 30a, which allow the connection of tubes of a pneumatic circuit 120 for controlling the pneumatic extrusion by modulating an air flow.

Figure 7:
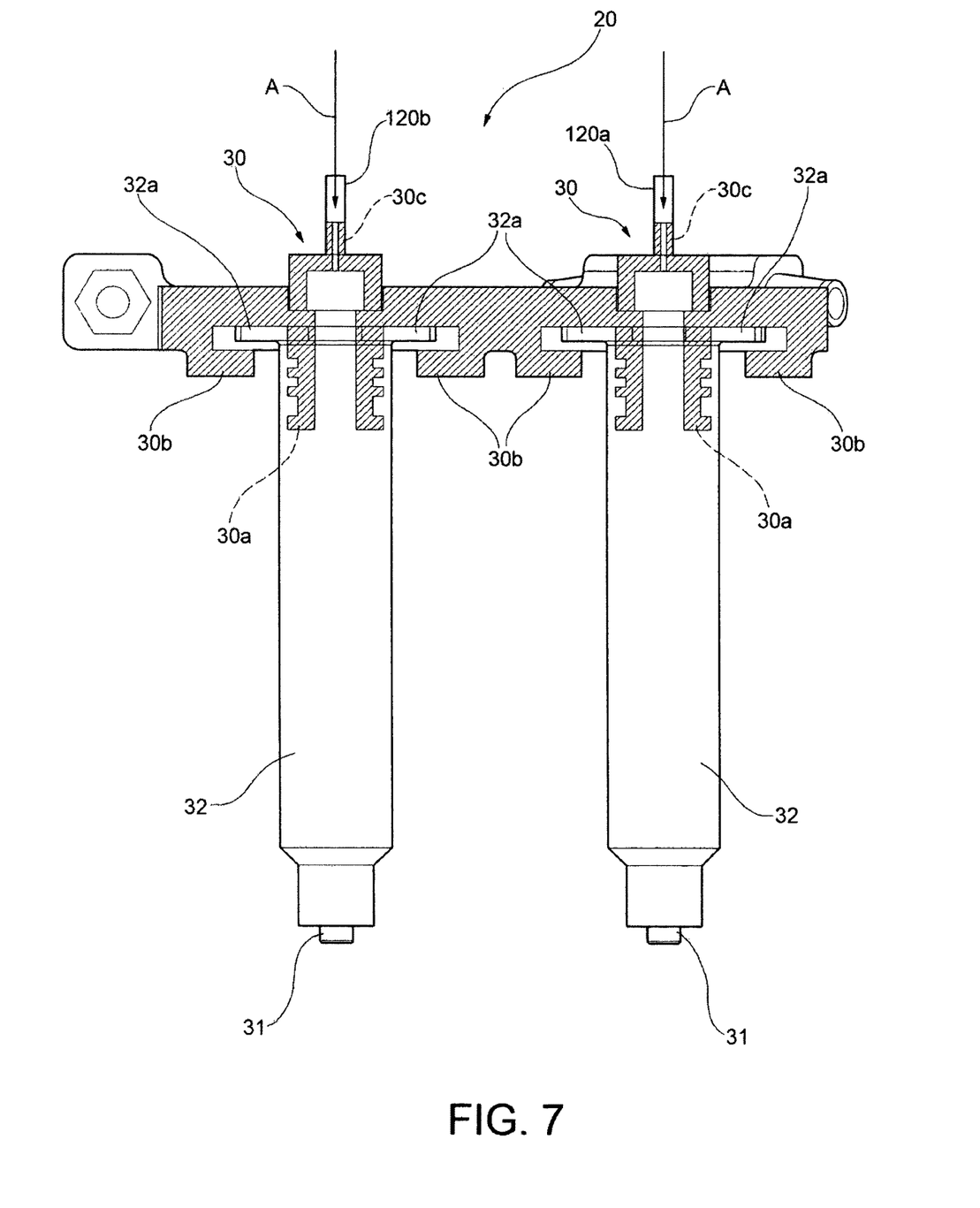
FIG. 7 is a cross-sectional view of the effector of FIGS. 4 and 5.

The absence of air leaks from the reservoir during the extrusion operation is guaranteed by a circular gasket 30c' positioned around the central pin 30a in a respective groove and by a gasket 30d placed at the base of the seats of the aforementioned reservoirs 32. The aforementioned gasket 30d guarantees air-tightness due to the opposing protrusions 30b that push the base of the reservoir 32 (equipped in turn with opposing fins 32a; see FIG. 7) against it after having performed the interlocking and rotation of the reservoir.

The pneumatic circuit 120 for controlling the pneumatic extrusion comprises the pressure system 90 able to create a suitable pressure gradient and the air flow modulation system 100. By setting a precise pressure, through the use of the controller 80, it is possible to supply an air flow (arrows A in FIG. 7), controlled by the aforesaid modulation system 100, which enters in the extruders 30 inside the reservoirs 32 by means of the tubes 120a, 120b of the pneumatic circuit 120 fixed to the movable platform 20 of the system, and promotes the deposition of material. The kinematic control of the device by means of the special actuation system, allows the deposition of the extruded material to be directed, using a manual control or through the communication of an entire work cycle that is interpreted by the microcontroller 80 due to the firmware saved in memory.

The apparatus described above is able to work using the electrospinning technique by means of the instruments present inside the structure 13 that houses the manipulator. These instruments comprise the constant voltage generator 50 and the terminals 33 necessary to be able to apply the electrical potential difference between the nozzles 31 and the working plane 40.

Since the apparatus is designed to accommodate the actuators 11b at a distance sufficiently far from the nozzles 31 of the extruders 30 present on the movable platform 20, the electric field produced by the application of the potential to the aforesaid nozzles 31 does not disturb the operation of the actuators. The electric field lines close on the working plane 40 which acts as an electrode connecting it to a known potential and ensures the absence of any disturbance to the electric field. Moreover, the pneumatic extrusion system described above does not comprise any metallic parts in order to avoid the aforementioned electric field disturbances.

The electrospinning of nanofibers and the subsequent deposition of the same on the working plane 40 takes place through the application of a potential difference between the nozzles 31 and the working plane 40, generating an electrostatic attraction between the needles of the nozzles and the aforesaid plane. The potential applied to the nozzles is set by means of the controller 80, which allows the actuation of the electrospinning system present in the apparatus. Due to the possibility of modifying the position of the end effector 20 along the vertical axis (axis z in FIG. 2), fibers with different thicknesses may be produced based on the needle-working plane distance; in particular, increasing this distance increases the thickness of the electrospun fibers, thus obtaining structures with variable nanoarchitecture.

The microextrusion process and that of electrospinning are carried out using the pneumatic extruders present, and, being able to choose nozzles of an established size based the process used, it is possible to obtain a precise resolution of the structure, which may vary from millimeter to micrometer in the microextrusion process. In this process, the movable platform 20 is brought closer to the deposition surface 40 in order to obtain an optimal distance between the nozzle and the working plane, allowing structures to be made through the layer-by-layer deposition of the extruded material. During the electrospinning stage, it is possible to deposit electrospun nanofibers at a distance between the needle and working plane set by the user by means of manual control or through the communication of an entire working cycle which is interpreted by the microcontroller 80 using the firmware saved in memory.

With the apparatus described above, it is possible to use separately the microextrusion and electrospinning technique or combine them to obtain multi-scale and multi-material structures with useful applications in tissue engineering, using different materials and alternating layer-by-layer the two manufacturing techniques present.

The invention claimed is:

1. A combined electrospinning and microextrusion apparatus, comprising:
a parallel robotic manipulator having a plurality of degrees of freedom and further comprising:
a fixed upper platform,
a plurality of kinematic linkages of non-conductive material,
an end effector supported and movable by the parallel robotic manipulator, the end effector being connected to the fixed upper platform through the plurality of kinematic linkages, each kinematic linkage of the plurality of kinematic linkages being movable by a respective actuator of a plurality of actuators arranged on the fixed upper platform, and
a plurality of extruders housed on the end effector, each extruder of said plurality of extruders comprising a respective interchangeable nozzle for extrusion of at least one material,
a working plane configured for deposition of extruded the at least one material,
a pneumatic circuit configured to supply a fluid flow to the extruders for controlling the extrusion of the at least one material, and
an electric generator selectively activatable to apply a potential difference between the interchangeable nozzles of the extruders and the working plane, whereby each individual extruder of the plurality of extruders is capable of operating selectively in either a microextrusion mode, in which the electric generator does not apply a potential difference between the working plane and the interchangeable nozzle of the individual extruder, and the individual extruder is configured for extrusion of the at least one material by microextrusion, or an electrospinning mode, in which the electric generator applies the potential difference between the interchangeable nozzle of the individual extruder and the working plane, and the individual extruder is configured for extrusion of the at least one material by electrospinning,
wherein said extruders are operable in an independent manner from each other.

2. The combined electrospinning and microextrusion apparatus of claim 1, wherein each extruder of the plurality of extruders comprises a reservoir for material, said reservoir being removably mountable on the end effector and carrying the respective interchangeable nozzle.

3. The combined electrospinning and microextrusion apparatus of claim 2, wherein each reservoir is mountable on a lower side of the end effector, a respective connector being provided on an upper side of the end effector to put the reservoir in fluid communication with the pneumatic circuit.

4. The combined electrospinning and microextrusion apparatus of claim 1, further comprising an insulation structure made of the non-conducting material configured to receive the parallel robotic manipulator and the working plane, a controller for controlling the parallel robotic manipulator, the pneumatic circuit and the electric generator, and a visualization system for enabling the parallel robotic manipulator and the working plane to be made visible from outside of the insulation structure.

5. The combined electrospinning and microextrusion apparatus of claim 4, wherein the controller is configured to adjust the potential difference applied by the electric generator between the interchangeable nozzles and the working plane.

6. The combined electrospinning and microextrusion apparatus of claim 4, wherein the controller is configured to modulate fluid pressure applied on the extruders.

7. The combined electrospinning and microextrusion apparatus of claim 4, wherein the controller is further configured to adjust humidity and temperature parameters within the insulation structure.

8. The combined electrospinning and microextrusion apparatus of claim 4, further comprising a recirculation system for removing vapors due to solvents employed during use of the combined electrospinning and microextrusion apparatus from the insulation structure.

9. The combined electrospinning and microextrusion apparatus of claim 1, wherein each individual extruder of the plurality of extruders is switchable between the microextrusion mode and the electrospinning mode.

* * * * *